United States Patent

Whitley

[15] 3,637,298

[45] Jan. 25, 1972

[54] MOTION-PICTURE CAMERA AND THE LIKE

[72] Inventor: Ernest M. Whitley, Palo Alto, Calif.

[73] Assignee: Red Lake Laboratories, Santa Clara, Calif.

[22] Filed: Aug. 11, 1969

[21] Appl. No.: 848,961

[52] U.S. Cl. ................................. 352/72, 352/84, 352/221
[51] Int. Cl. ................. G03b 1/50, G03b 23/02, G03b 39/00
[58] Field of Search ......................... 352/221, 227, 84, 72, 78

[56] References Cited

UNITED STATES PATENTS

| | | | |
|---|---|---|---|
| 1,957,904 | 5/1934 | Ord | 352/221 |
| 2,903,953 | 9/1959 | Meixner | 352/221 X |

Primary Examiner—Louis R. Prince
Assistant Examiner—Frederick Shoon
Attorney—Schapp and Hatch

[57] ABSTRACT

A motion-picture camera adapted for use on aircraft or the like where extreme forces are likely to occur, and in which a rapid exchange mechanism is effected by a two-piece construction with the film gate and associated film drive mechanism decouplable from the main body of the camera, and in which the film drive mechanism operates with an eccentric drive for providing stop and go motion through a zero clearance gate, the improvements consisting of an improved adjustable zero clearance gate, guides for handling the film through the film gate, and improvements in the two-piece construction including a novel latch mechanism capable of providing a rapid exchange, yet which also positively provides for accurate placement of the film gate in exact focus position.

15 Claims, 10 Drawing Figures

INVENTOR.
ERNEST M. WHITLEY
BY
Schapp & Hatch
ATTORNEYS

MOTION-PICTURE CAMERA AND THE LIKE

BACKGROUND OF THE INVENTION

The present invention relates to a motion-picture camera and the like, and more particularly to a motion-picture device adapted for quick exchange of a magazine element from a main body permanently on vehicles such as aircraft, with the camera being capable of reliable operation under extreme conditions of vibration and change of velocity.

Heretofore, high-speed motion-picture cameras in which the film is advanced intermittently, one frame at a time have been beset with many difficulties and problems. One of the major problems with such high-speed picture cameras resides in the need for overcoming inertia as the film and associated parts are caused to accelerate between the stop and go operations. This change of inertia not only causes the need for additional energy to be placed in the system, but also places a heavy strain on all of the moving parts. Accordingly, it is desirable to minimize the number of moving elements which undergo such rapid changes in the velocity during the stop and go movement of the film through the film gate.

In systems of this sort, it has been found desirable to utilize a zero clearance film gate, because the usual film gates having gate members yieldably urging the film into exposure position are troublesome due to vibrational forces, and other problems which would be obvious to one skilled in the art. Accordingly, it is considered desirable, if not necessary, to utilize a zero clearance film gate with such a film drive mechanism. In addition, the camera of the present invention is designed to resist not only the vibrational forces of the eccentric drive in the film drive mechanism, but also to resist the sudden changes of velocity caused by acceleration and deceleration of an aircraft or the like carrying the same. Accordingly, the zero clearance film gate is additionally desirable.

However, difficulties have been found in designing a zero clearance film gate because the thickness of films will vary from one lot to another. Accordingly, if the zero clearance film gate is made to accommodate an average film of 0.007-inch thickness, certain lots of film will be larger and will tend to bind in the gate, while certain others would be smaller and would tend to be too loose in the gate. However, it is generally found that the film thickness remains constant for the load on any given supply reel.

SUMMARY OF THE INVENTION

Accordingly, it is a primary object of the present invention to provide a zero clearance film gate which may be accurately and rapidly adjusted in a precision manner so as to provide a tailormade fixed clearance for each film reel utilized within the camera.

Another object of the invention is to provide a simple two-piece camera construction in which the film magazine section contains the film gate, film drive means and film all adjusted for proper operation, with the two-piece construction being formed with an improved latch system whereby easy removal may be effected, yet the improved latch structure will positively assure proper and accurate alignment of parts and retain same under severe conditions of stress.

Specifically, the present invention incorporates certain improvements over the camera covered in the Campbell patent application cited above, and a major improvement resides in the adjustable zero clearance film gate structure of this invention, and in the guide means for guiding the film through said gate.

For example, when the film loop is pulled downward and outward by the eccentric it pulls the film off the registration pin and moves down rapidly to pull the whole loop down and obtain the "bite" of film. However, after the film has been pulled down and the eccentric moves the film over into engagement with the registration pin for the next exposure, there should still be a sufficient crank on the eccentric to allow the film to remain stationary for a period of time. In this situation, the eccentric will travel upward and leave a certain amount of slack in the loop between the registration pin and sprocket. The greater the amount of slack, the longer the period of time before the eccentric pulls the film off the registration pin again, and the greater the exposure time or degree of shutter achieved by the mechanism.

In order to hold the film in stationary position when it engages the registration pin, the spring-loaded compensating guide wheel means is in a compressed condition, pulling against the film and tensioning it in the exposure area of the film gate. Thus the eccentric drive means cooperates with the spring-loaded upper compensating drive means to achieve the desired stop and go motion, and the mechanism may provide an excellent degree of exposure time when sufficient slack is provided.

However, it is important in providing this slack that the film not be broken or the holes therein torn as the slack comes out and the eccentrically mounted wheel means operates in driving engagement. In order to achieve additional slack, the film has been brought over the full surface of the sprocket means, and the loop guide means brought in close to the sprocket so as to assure additional sprocket grip and winding friction. In this way, an improved exposure time is achieved by the improved guiding setup of the film drive mechanism shown herein.

It is also important that the latch mechanism hold the two sections of the camera firmly together regardless of the sudden changes of direction, g load, and the like which occur in military aircraft. Accordingly, the latch structure has been improved so that the latch positively holds the two pieces together with the latch spring being positioned so as to prevent even partial latch opening during extreme maneuvers that may cause yielding of the spring. In addition, the two-piece construction is formed so that exact tolerances of the film gate to the objective lens is achieved when parts are substituted and the same focal plane is positively provided. In addition, other improvements such as light shields over certain conventional components are incorporated herein.

Accordingly, it is seen that it is a further object of the invention to provide various improvements in the operational aspect of the camera as well as to provide an improved film gate structure.

Further objects and advantages of the invention will be apparent as the specification progresses and the new and useful features of the motion-picture camera and the like will be more fully defined in the claims attached hereto.

BRIEF DESCRIPTION OF THE DRAWINGS

The preferred form of the invention is illustrated in the accompanying drawings forming a part of this specification, in which.

While only the preferred form of the invention is shown, it should be understood that various changes or modifications may be made within the scope of the claims attached hereto without departing from the spirit of the invention.

DETAILED DESCRIPTION OF PREFERRED EMBODIMENTS

Referring to the drawings in greater detail, there is shown in FIGS. 1 through 4 a typical movie camera 11 constructed according to the invention, said camera being formed with a door 12 and two main sections 13 and 14 which are capable of quick assembly and disassembly. Section 13 is formed with a main housing 16 adapted to provide a primary support and suitable for permanent mounting in aircraft or the like, when desired. This section 13 contains a suitable objective lens assembly 17 constructed to fit over an aperture 18 formed in housing 16. The section 13 also contains a suitable motor 19 (see FIG. 4) for providing power to the various moving parts, the motor 19 here shown being an electrical motor supplied through a typical appliance cord and operated by switch 20 and speed control 21.

As will become more apparent hereinafter, section 13 also contains a shutter 25 (see FIG. 6) synchronized to provide a speed dependent upon the speed of the motor, and a power-coupling means 22 for transmitting mechanical power from the section 13 to section 14.

The section 14 is formed with a housing 23 having an aperture or opening 24 formed to correspond with aperture 18 of housing 16, said apertures providing for exposure of the film at film gate 26. The section 14 also comprises a film drive means 27 adapted to receive power from the power coupling means 22 and drive the film through the film gate in stop and go fashion.

The invention also provides means for preventing lengthwise movement of a strip of film 30 having a series of holes 31 along one side thereof while a picture is being taken, comprising a film drive means 27 and a registration pin 28 (see FIGS. 6 and 7) mounted in the housing for engagement with the holes of the film and for holding the film stationary when a hole is so engaged; said registration pin cooperating with said film drive means. The film drive means 27 comprises an eccentrically mounted wheel means 29 positioned for contacting the film strip and moving same laterally back and forth thereby causing the moving film to periodically engage and disengage the registration pin 28. This eccentrically mounted wheel means 29 operates by engaging a loop 32 of the film 30 formed by passing the film 30 over sprocket 33, with the sprocket having teeth 34 (see FIG. 3) for engaging holes 31 of film 30. The loop 32 is guided and shaped by guide roller 36, a compensating guide and wheel means 37, the eccentrically mounted wheel means 29 already mentioned, and guide roller 38, and back to sprocket 33 (see FIG. 3). Other suitable guide rollers such as rollers 39 and 41 are provided in order to direct the film through a desired path and ensure engagement with the sprocket means.

Figure 3:
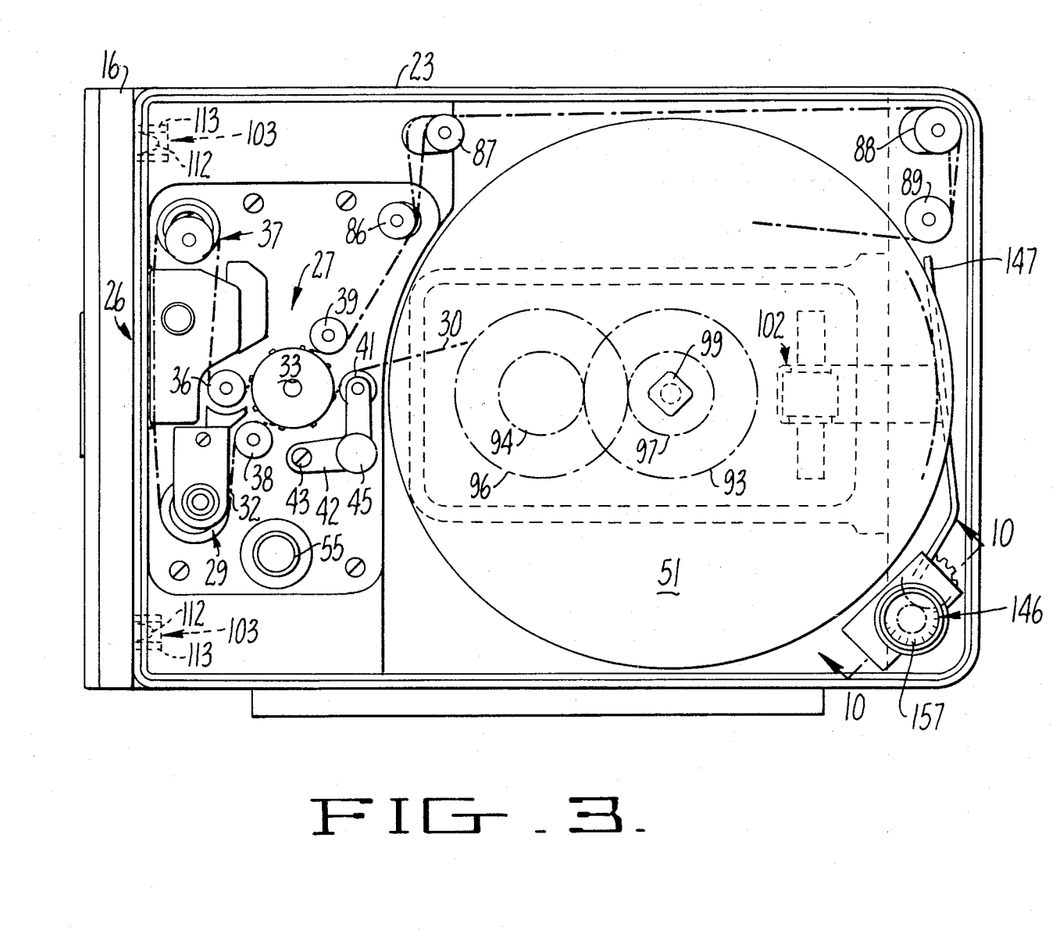
FIG. 3, a side elevational view of the camera shown in FIGS. 1 and 2, with the cover door removed for better illustration of the internal parts.

At least one of the additional guide rollers 36, 38, 39, and 41 should be retractable for simpler threading of the film 30 over the sprocket 33. As best seen in FIG. 3, guide roller 41 is carried on an arm 42 pivotally mounted at 43 and carrying a suitable knob 45 for retraction and including a suitable holding mechanism for fixing the unit in locating position. Although only one such retractable guide roller is shown, it will be appreciated that more than one may be made retractable if desired. It should also be noted that these guide rollers are all spaced rather close to the sprocket 33, and typically rollers 36 and 38 will have a clearance of say about five-thousandths of an inch from the ends of the teeth on the sprocket. With this close configuration, better gripping of the film by the sprocket is achieved so as to hold the film more tightly without injury thereto and permit excellent functioning of the eccentrically activated stop and go system in the loop.

Figure 6:
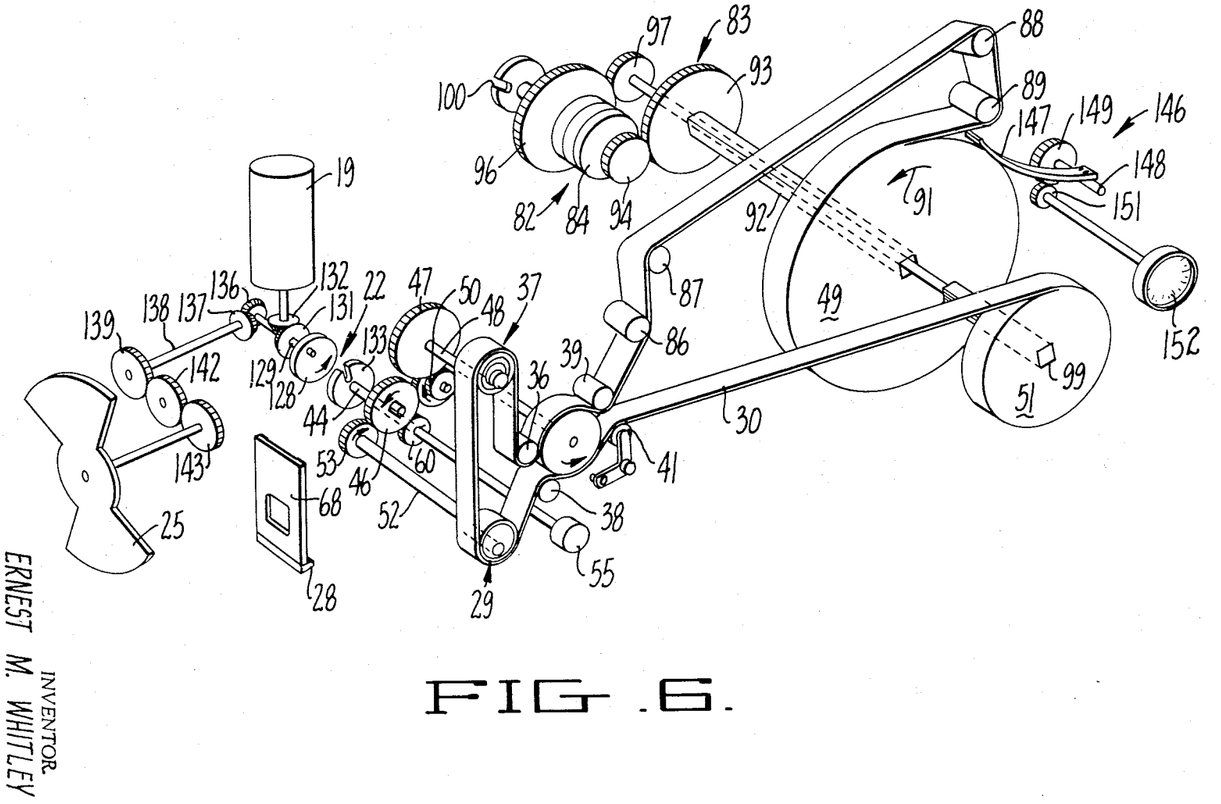
FIG. 6, a diagrammatic view of the overall drive mechanism of the camera shown herein illustrating how the moving parts are synchronized together.

Referring more specifically to FIG. 6, it is seen that a shaft 44 receives power from coupling means 22, and this shaft 44 is part of and provides power for film drive means 27. Shaft 44 drives a gear 46, which in turn drives gear 47 through gear 50. Both gear 47 and the sprocket 33 are mounted on shaft 48 to complete the gear train between sprocket 33 and power coupling means 22. The sprocket 33 then drives film 30 from a supply reel 49 and onto a takeup reel 51 in a manner which will be explained more fully hereinafter. Sprocket 33 also feeds film into the loop 32 at a substantially constant velocity, and takes up film from the loop at the exact same velocity, the exact length of the loop being fixed by the engagement of the sprocket with the film strip.

The movement of the section of the film loop passing through the film gate is regulated by the eccentrically mounted wheel means 29 and by the compensating guide and wheel means 37, which are formed to provide stop and go motion of the section of the loop therebetween. In the form here shown, the eccentrically mounted wheel means 29 is positively driven by shaft 52 which is suitably keyed or otherwise fixed for rotation with gear 53; and gear 53 is driven by gear 46. Manual rotation film drive 27 may be achieved for adjustment, when desired, by knob 55 operating through gear 60.

Figure 7:
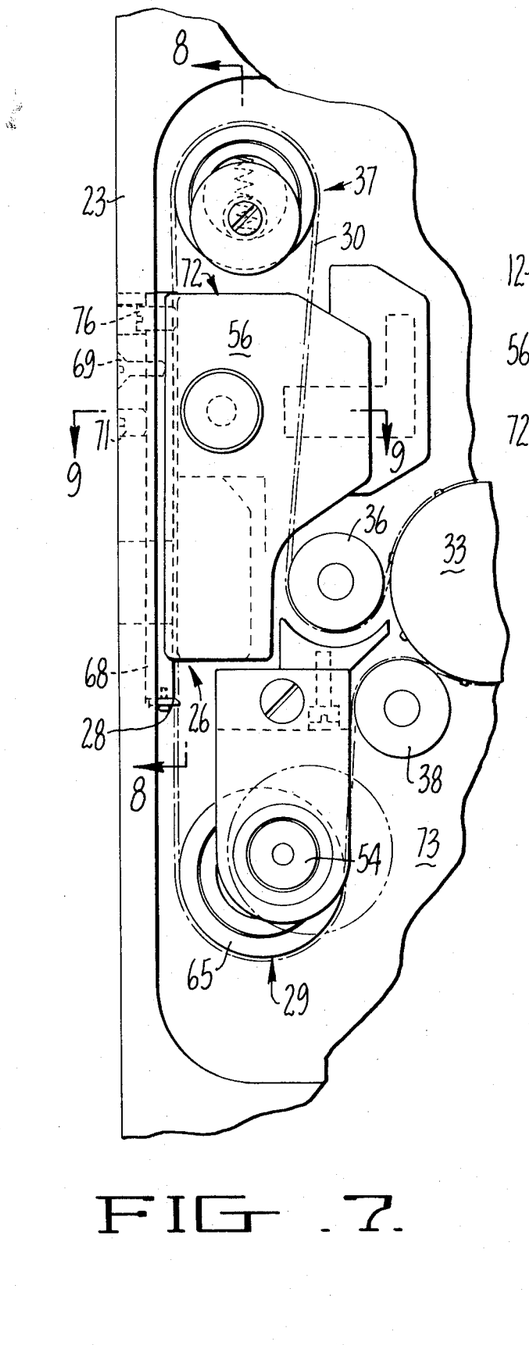
FIG. 7, an enlarged fragmentary view of a portion of the camera as shown in FIG. 3 illustrating in greater detail the film gate and associated film drive mechanism for moving the strip of film therethrough.

The preferred structure of the sprocket 33, eccentrically mounted wheel means 29, and compensating guide and wheel means 37 are shown in FIG. 7 together with their mounting in housing 23. The eccentrically mounted wheel means 29 comprises an eccentrically mounted inner wheel structure 54 carried on shaft 52, and a pair of rings or sleeve 65 rotatably carried thereon by suitable ball bearings (not shown).

It will be noted from FIG. 6 that the film and outer sleeve 65 move in the opposite direction from the inner wheel structure. Thus, as shown in FIG. 7, the eccentrically mounted wheel means 29 pulls the film outward and downward and then over toward the registration pin 28 as it moves upward. In the structure here shown, compensating guide and wheel means 37 is provided so as to allow the film to be pulled downward by the eccentrically mounted wheel means 29, and otherwise compensate for the movement thereof. It will be appreciated that the eccentrically mounted wheel means 29 is formed to pull the film downward, and then move it over onto the registration pin. As the film is pulled down, the compensating means 37 allows for the pull down through a spring mechanism, and then takes up slack and holds the film on the registration pin during the substantially hold or stationary position of the film.

Thus when the eccentric is at the bottom, the springs in the compensating guide and wheel means have been compressed to the fullest extent and are starting to stretch upward because the sprocket 33 is moving film toward this guide and the eccentric has ceased in its pulldown. Thus as the eccentric moves the film over toward the registration pin at the beginning of its upward movement, there is actually a slight reverse movement of the film as it is pushed over the registration pin and the spring system of the compensating wheel means pulls the loop upward. As the eccentric continues to move up, the lower part of the film loop is taken up by sprocket 33, but not quite as fast as the allowable film loop from the eccentrically mounted wheel means, so that some slack actually developes at this time. Similarly, the film loop is moving upward at the top by virtue of the spring pushing outward to take up the film delivered from the sprocket 33. Just prior to reaching the upper part, the eccentric removes the film from the registration pin and at this point, the spring is just about fully extended in the compensating wheel means so that slack can now develop at this upper position until the eccentric operates in its downward movement to take up the film much faster than delivered and move the film downward for a repeat cycle.

In order to achieve a sufficient stop motion, the film should be held onto the registration pin as described, and a certain amount of slack must come into the loop in order to allow for an extended stop position or excellent exposure time. Accordingly, it is important to provide the various guide means in close position to the sprocket 33 and to each other so that maximum wrap around of the film on the sprocket is obtained.

Figure 8:
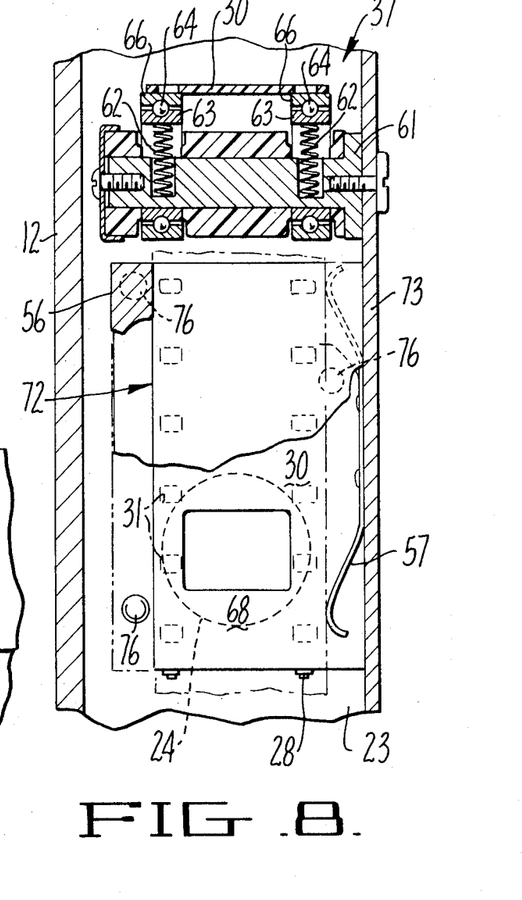
FIG. 8, a fragmentary elevational view of the film gate substantially as seen in the plane of line 8—8 of FIG. 7.

It is also important to maintain the film in its lateral path throughout the entire loop portion. As shown in FIGS. 7 and 8, the film is maintained laterally by a lateral guide plate 56 bearing against one side of the film, and spring means 57 bearing against the other side of the film 30 on each side of the exposure position. In addition, the film also bears against lateral guide plate 56 on the entrance side of compensating guide and wheel means 37 and is urged thereagainst in yieldable fashion by arm 58 of cutoff switch 59 (see FIGS. 4 and 7). Although the cutoff switch is used to maintain the position of the film for the sake of simplicity, it will be appreciated that other means may be used, the important consideration being to laterally position the film as it advances toward the compensating guide and wheel means 37.

This means 37 is also specially constructed to allow rapid rotation without difficulty in maintaining the film in proper location on the roller. In order to assure this stability, each side of the roller is separately urged by a separate spring. In this way, the film edges are kept moving in their proper path by virtue of the lateral guides and the springs acting thereon from the compensating wheel means 37.

Referring again to FIG. 8, it is seen that the compensating wheel and guide means 37 comprises a central stub shaft 61 formed to carry a pair of springs 62 therein which in turn bias a pair of rings 63 in the upward direction as shown in the Figure. Carried on the rings 63, are suitable ball bearings 64 and outer rings 66, the inner rings 63 and outer rings 66 serving as typical raceways for the ball bearing units. The double-spring construction not only serves to assure proper elevation of the compensating wheel structure, but also serves to cooperate with a double registration pin as here shown so that each spring acts together with a separate pin on each side of the film for maintaining the film taut during the exposure thereof.

Figure 9:
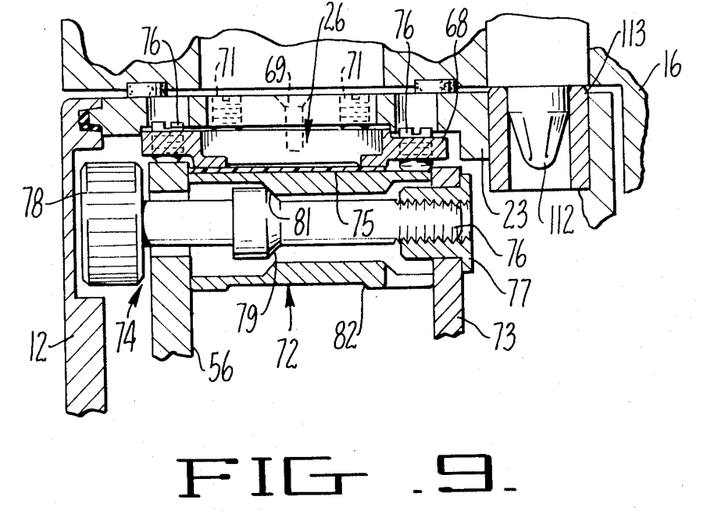
FIG. 9, a cross-sectional view of a portion of the film gate structure substantially as seen in the plane of line 9—9 of FIG. 7.

The preferred form of the invention also provides a novel film gate comprising a guide means 68 in the form of an aperture plate mounted inside the housing 23 and providing a rectangular exposure aperture behind the windowlike opening at 24 as seen in FIG. 8. Referring more particularly to FIGS. 7 and 9, it is seen that this aperture plate 68 is held with a slight adjustable gap by push-pull screws with two screws 69 pulling the plate toward the housing and four screws 71 pushing away to maintain the gap. Behind the aperture plate, is a backing block 72 having a film guide surface 75 and carrying the lateral guide plate 56 thereon. The backing block is mounted on mechanism plate 73 along with the sprocket and guide rolls and various associated gears. In order to space the backing block from the aperture plate and provide the desired zero clearance film gate, clamping means 74 are utilized to urge the block toward three adjustable setscrews 76, with the setscrews 76 adjusted to accommodate the particular thickness of the lot of film being loaded into the camera magazine.

The clamping means 74 comprises a screw 76 threaded into a bushing 77, which bushing is carried solidly in mechanism plate 73. Screw 76 also comprises a knurled handle 78 for manual rotation and a cam surface 79 formed to abut and urge against cam surface 81 of the backing block, the cam surfaces being formed in the bore in the backing block and on the screw as shown in FIG. 9. Backing block 72 also contains a channel 82 to prevent scratching of the film, the back side of the backing block serving to guide the film toward the compensating guide and wheel means 37.

The registration pin 28 is attached to the aperture plate 68, as shown in FIG. 6, so as to be permanently connected to housing 16. Referring more particularly to FIG. 6, it is seen that the present camera has means for moving the strip of film 30 longitudinally from the supply reel 49 through the film gate 26 and to the takeup reel 51, with the system having means for driving the supply reel in rotary motion, and having a slip clutch assembly 82 interposed in driving relation between the supply reel and the takeup reel. The slip clutch assembly 82 comprises a gear drive train 83 tending to drive from the supply reel to the takeup reel at a multiplied speed of rotation, and a slip clutch 84 interposed in said gear drive train operable to allow the drive of said supply reel to drive the takeup reel at a reduced speed of rotation. In this way, by a combination of multiplied drive together with slippage, the overall drive ratios between supply reel and takeup reel are achieved between the two extreme values required.

Figure 4:
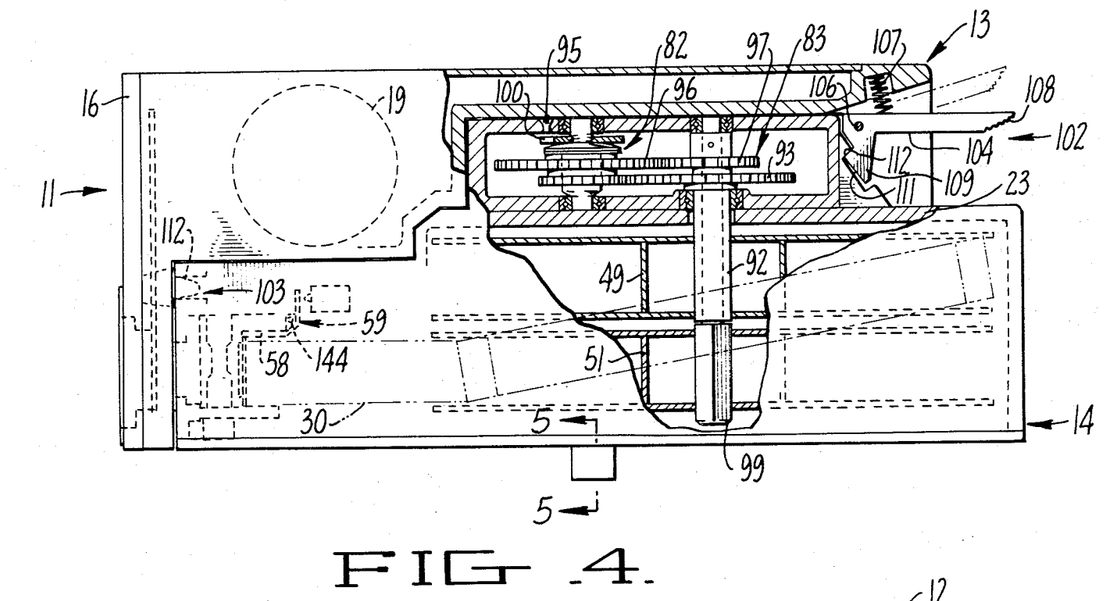
FIG. 4, a plan view of the camera shown in FIG. 1, with certain parts of the housing broken away and certain of the internal parts shown in section for better illustration thereof.

As shown in FIGS. 4 and 6, supply reel 49 is driven by the positive drive on sprocket 33 acting to pull film strip 30 over guide rollers 39, 86, 87, 88 and 89 and off of the takeup reel. In other words, the film provides the power coupling between sprocket 33 and supply reel 49 so as to positively drive supply reel 49 as indicated by the arrow 91 thereon. Supply reel 49 is carried on a square shaft 92 which is fit for rotation therewith and transmits the rotation of supply reel 49 to gear 93. Gear 93 then drives gear 94 in a rotational increase, gear, 94 then driving gear 96 through the slip clutch 84. Gear 96 drives gear 97 in a rotational increase, and gear 97 causes a round shaft to rotate therewith, the round shaft being journaled through square shaft 92 and squared at its end 99 where it fits into and rotates with takeup reel 51. It will be seen that takeup reel 51 will rotate as long as there is sufficient film 30 available from sprocket 33, but cannot move any faster than sprocket 33. Accordingly, when the takeup reel 51 tries to drive faster than required to take available film, the slip clutch mechanism 84 is operative to provide for a positive takeup without undesirable overdrive. In order to adjust the slip clutch, a plug screw 95 is provided in housing 23 near the clutch. With the plug removed, a pin is inserted to hold the clutch at notch 100, and the slip tension adjusted as desired.

Figure 2:
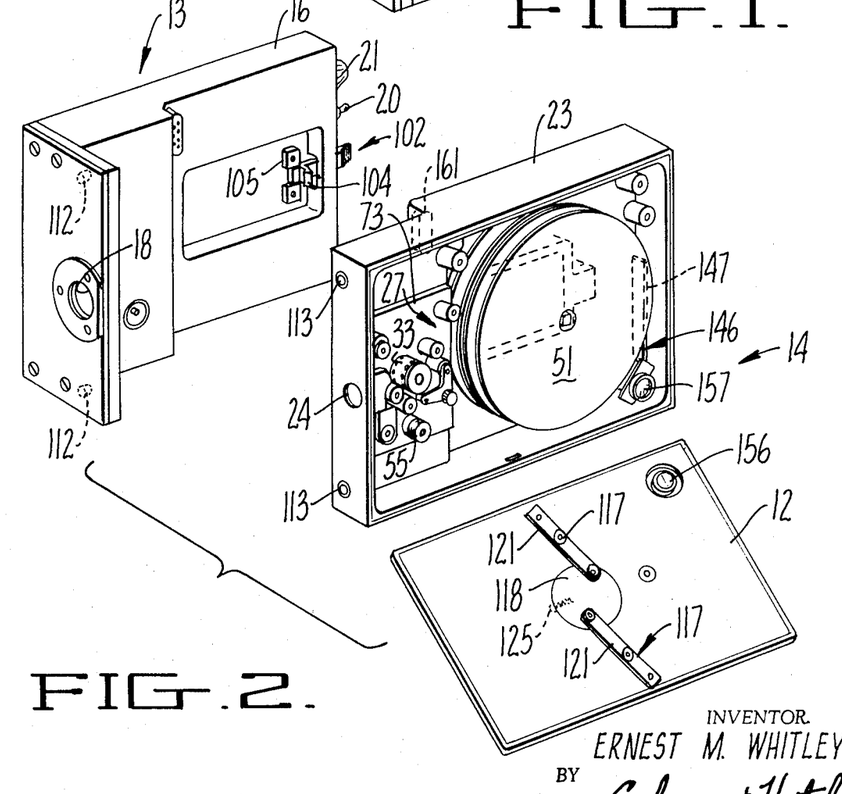
FIG. 2, an exploded perspective view of the camera of FIG. 1, showing the cover removed and the two camera sections separated from one another.

As shown in FIGS. 2 and 4, the camera is divided into two main detachable sections 13 and 14. It will be seen, that all of the film gate, the film and associated drive means are carried in section 14, with the exception of the main motive power source operating through power coupling means 22. In this way, the section 13 can be permanently mounted on an aircraft or the like, if desired, and rapid film changes may be effected by substituting sections 14. On the other hand, ordinary film changes can be effected by opening the door 12 and unloading and reloading the film in section 14. In order to achieve a rapid change by swapping sections 14, it is important that the new section 14 with the film already positioned for exposure be carried in proper focus so that continued exposure may take place with minimum loss of time. This is achieved by having the objective lens and shutter, mounted in a housing in the main section 13, and constructing the housing of section 14 to fit in accurate juxtaposition thereto.

The fit at the film gate is shown in FIG. 9; and, as there shown, a 0.020-inch airgap is provided between sections. A light shield in this gap is achieved by felt washer 101. The aperture plate is then adjusted as explained above to provide exact positioning for the exposure plane. Coupling of the two sections together is then provided by a latch fastener 102 located at the rear end of section 13 as shown in FIGS. 2 and 4, operating together with the plug means 103 at the forward end of section 14.

As best seen in FIG. 4, the fastener 102 comprises a generally L-shaped member 104 pivotally mounted at the heel portion through a pin 106 mounted on suitable blocks 105, and urged toward a closed position by a compressed spring 107. The long arm of the L is formed with a grip 108 at the far end for manual opening, and the short end of the L is formed with a latch 111 positioned to lock over a shoulder 112 built into the housing 23 of section 14. With this construction, section 14 is added to section 13 by fitting the plug means 103 together and bringing the two sections in place as shown in FIG. 4, and fitting the latch 111 in locked position. In this way, quick assembly, and by reverse fashion, quick disassembly of the two sections may be easily effected.

Plug means 103 comprises a pair of male members 112 formed to fit a pair of sockets 113 (see FIGS. 2, 3 and 9). The specific construction is best shown in FIG. 9 where socket 113 extends from the face of housing 23 of section 14 to space the sections. Male members 112 are formed to locate the film gate accurately for effective substitution of one section 14 for another.

Figure 1:
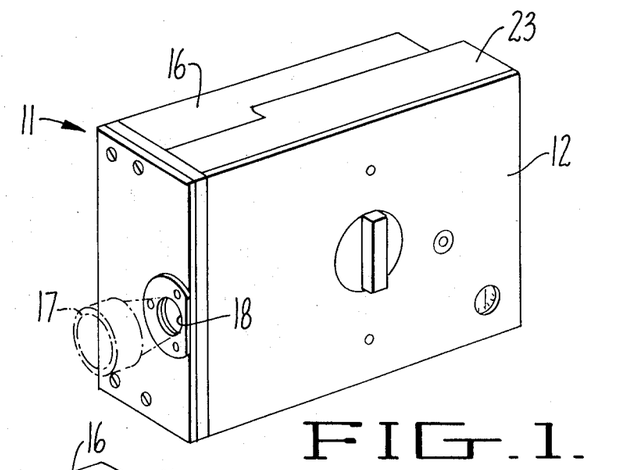
FIG. 1 is a perspective view of a typical movie camera incorporating various features of the invention in the preferred form thereof.
Figure 5:
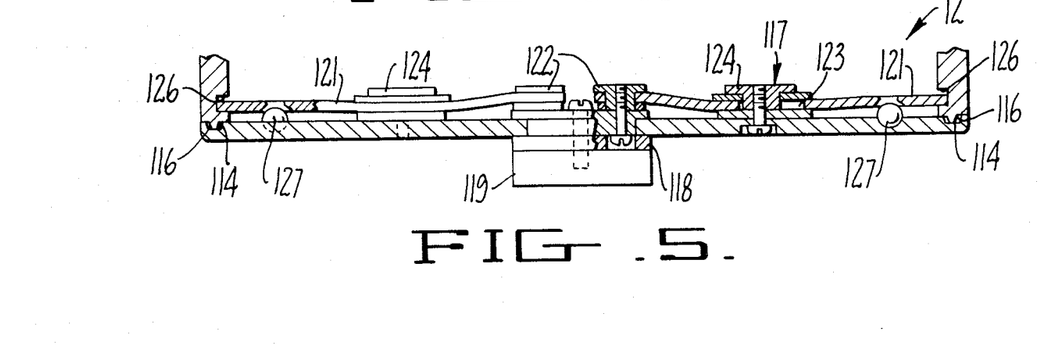
FIG. 5, a sectional view of the camera shown in FIG. 4 taken substantially in the plane of line 5—5 thereof.

The preferred camera constructed according to this invention is also provided with an access door for effecting film changes in the usual manner. As shown in FIGS. 1 and 2, the door 12 is formed to encompass the entire side of section 14 so that the takeup and supply reels may be easily changed, and the film threaded around the appropriate guide means and sprocket. The door 12 is formed with a channel 114 (see FIG. 5) sized to cover raised strip 116 extending clear around the door inside of the camera from external light.

In order to restrain the door against outward movement and hold the door securely in place, lock means 117 is provided. As here shown, the lock means comprises a member 118 mounted for rotation and equipped with a handle 119, a pair of leaf spring latches 121 pivotally attached to member 118 at their internal ends through nut and washer assembly 122 and directed outwardly on rotation of member 118 by the action of guide slots 123 on each spring and associated nut and washer assemblies 124. A pair of retaining recesses 126 are formed in housing 23 for receiving the springs at the ends. Ball detents 127 are provided under each of the leaf spring latches to allow the springs to cam at their extremities and bear clampingly on the housing and to urge the door against the housing and thereby secure it tightly. On opening, the balls urge the springs outward for easy retraction. In order to prevent chattering when the door is closed, a ball detent 125 is used to hold rotating member 118 in position.

As indicated above, the sections 13 and 14 are assembled simply by putting them together, and no special manipulation is required to assemble the power coupling means 22 which couples the power from the motor 19 in section 13 to the film drive means 27 in section 14. In order to achieve this automatic coupling, without binding, the coupling device is formed with a spring-relieved pin to allow the coupling members to fit together and driving only when the proper synchronism is obtained.

The coupling means 22 comprises a drive member 128, which receives power from motor 19 through shaft 129 and gears 131 and 132 (see FIG. 6). Power-coupling means 22 also comprises a driven member 133 carried on shaft 44, and suitably mounted for rotation within housing 23 of section 14. The driven member 133 is provided with a slot formed to receive the pin of drive member 128. Accordingly, when the sections are put together, both the drive member and the driven member are disposed in their proper relationship to each other, but the internal spring of drive member 128 is compressed so as to relieve its drive pin unless and until the drive assembly is or becomes oriented in proper synchronized position. Thus as soon as the drive member 128 is rotated a sufficient fraction of rotation, its spring urges its pin into engagement within the slot of the drive member to couple the drive member with driven member and transfer the rotation on the drive member to shaft 44. With the pin and slot drive provided, binding which tends to occur on coupling when shafts are not in exact alignment is eliminated. This effect is provided because the pin is free to move radially in shaft a slight amount, if necessary, to compensate for any slight nonalignment that is likely to occur in even the most carefully precision made devices.

Referring again to FIG. 6, it is seen that the driven member 133 receives power from motor 19 through a direct drive and that the shutter 25 also receives power through a direct drive. In this way, the shutter rotation is positively synchronized with the action of the film drive means so as to expose each frame of film when it is in stationary position, and to block off the film during the movement of successive frames into exposure position. Any suitable shutter system may be utilized, provided this synchronization is provided for, and the embodiment shown herein is merely exemplary of a preferred construction utilizing direct gear drives.

FIG. 6 shows the gear train diagrammatically from motor 19 to drive member 132 of coupling means 22 as explained above with the armature of motor 19 driving bevel gear 132 which is mounted on its shaft. Shaft 129 which drives the coupling means 22 and the film drive means therefrom also drives a bevel gear 136. This gear drives a bevel gear 137 mounted on shaft 138, which shaft also carries gear 139. The gear 139 drives the shaft of shutter 25 through gears 142 and 143, the gears being appropriately located to assure the desired direction of shutter rotation and positively provide a synchronous rotational velocity.

Other parts may be added which are desirable in movie cameras in accordance with the conventional construction. As explained above, cutoff switch 59 is provided with arm 58 to help restrain the film against lateral movement. A specific layout of this switch is shown in FIG. 4, where arm 58 is shown in an L-shape and pivoted at 144. A spring (not shown) normally urges the switch arm in open position, but the film 30 prevents the spring from opening the switch until film is fed past the switch arm 58. In this way, the cutoff switch serves a dual function.

Figure 10:
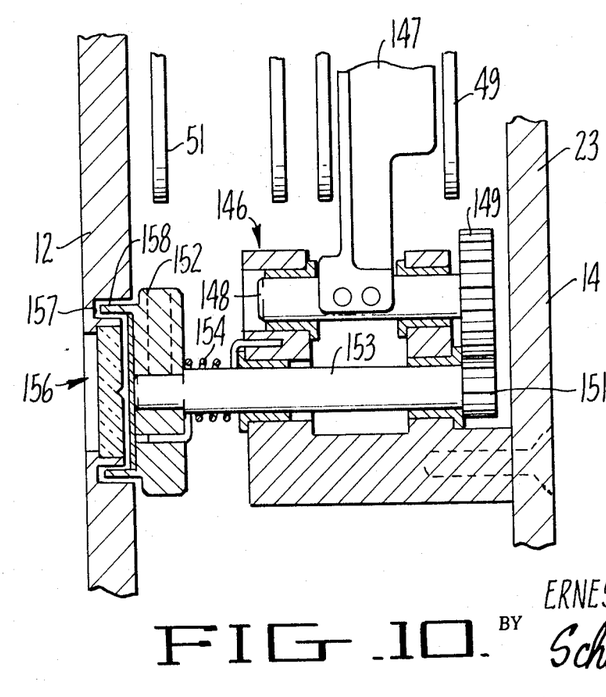
FIG. 10, a cross-sectional view of the footage indicating mechanism substantially as seen in the plane of line 10—10 of FIG. 3.

As here shown, a footage counter 146 is also provided, the counter being shown diagrammatically in FIG. 6 and in detail in FIG. 10. This footage indicator comprises a sensing arm 147 fixed to shaft 148 for rotation therewith, and urged toward supply reel 49 so as to rotate as film is removed from the reel and indicate the amount of film either removed or remaining on the reel by its rotational position. The rotation of shaft 148 is transmitted through gear 149 and gear 151, where an increased rotation occurs so as to utilize substantially the entire revolution of the dial for the operative arc of arm 147.

Indicator dial 152 is mounted for rotation with shaft 153 which in turn is keyed for rotation with gear 151. A spring 154 provided to urge the dial 152 and associated gear train through to arm 147 whereby arm 147 is yieldably urged against the film on reel 49. Typical mounting structures are provided for this system as more clearly illustrated in FIG. 10.

In order to see the dial 152, a window 156 is provided in door 12, and a circular channel 157 is provided around the window and receives circular flange 158 of dial 152. In this way, a light seal is positively provided within suitable working tolerances in the removable door.

Since certain parts of the electrical circuitry are located in section 14, and the power is supplied to section 13, a plug is required to form the connections in detachable fashion. Thus a female plug is provided on section 13, and male plug 161 on section 14 connects thereto. Since the sections are coupled and decoupled by a relative rotation, the desired connect and disconnect is effected smoothly.

From the foregoing description, it is seen that I have provided various improvements in a two-piece camera construction designed with an eccentrically operable film drive mechanism for providing stop and go motion of the film through the film gate rapidly and with a minimum of movement of parts.

I claim:

1. In a high-speed movie camera adapted to move a strip of film in stop and go motion through a film gate formed for holding film positively stationary in exposure position when the camera is subjected to relatively severe conditions of vibration and change of velocity, in combination, a zero clearance film gate, a stationary registration pin mounted in said film gate, and a film-driving means; said film gate being constructed with guide means at the film gate having guide elements between which the film passes and formed for establishing substantially zero clearance by providing a distance between said guide elements substantially exactly the same as the thickness of the film going through the film gate, said guide elements being relatively adjustable whereby film strips of different thicknesses may be accommodated in said zero clearance fashion, and means for fixedly securing said guide elements in the desired adjusted position.

2. The high-speed movie camera defined in claim 1, in which said guide elements comprise a pair of guide plates having surfaces spaced in said zero clearance fashion, one of said plates being substantially fixedly mounted, and the other of said plates being adjustable with respect to said first plate, and clamping means for holding said adjustable plate in tight fashion in a selected predetermined position.

3. A movie camera as defined in claim 2, in which setscrew means are provided to adjust the gate thickness and cooperate with said clamping means whereby actuation of the clamping means cinches said setscrew means tightly in a desired holding position.

4. In a high-speed movie camera adapted to move a strip of film in stop and go motion through a film gate formed for holding the film positively stationary in exposure position when the camera is subjected to relatively severe conditions of vibration and rapid change of velocity, in combination, a zero clearance film gate, a stationary registration pin mounted in said film gate, and a film-driving means;
   said clearance film gate comprising
      an aperture plate having a guide surface for accurately spacing the film in the film gate, and
      a backing block having a guide surface cooperating with the guide surface of the aperture plate to provide a zero clearance gate, said backing block being adjustable relative to the aperture plate to accommodate film according to the film thickness, and means for fixedly securing said backing block and said aperture plate in the desired adjusted position; said film drive means comprising
      a sprocket means formed to engage the film through said holes at two positions on each side of the film gate,
      guide means for directing the film through a path extending from a supply means past the sprocket to and through the film gate and back through the sprocket to a film-receiving means, and
      a sprocket drive means for driving the sprocket at a substantially constant speed,
      said guide means including an eccentrically mounted wheel means positioned for contacting the film in the path between the sprocket means and the film gate and causing the film moving toward said eccentrically mounted wheel means in a substantially uniform velocity to move from said eccentrically mounted wheel means in stop and go motion.

5. A motion-picture camera as defined in claim 4, in which the film drive means also comprises a spring-loaded compensating guide and wheel means positioned on the side of the film gate opposite the eccentrically mounted wheel means and formed for cooperation with the registration pin to hold the film stationary during the stop motion thereof.

6. A movie camera as defined in claim 5, in which the compensating guide and wheel means comprises a pair of springs adapted to yieldably urge the wheel and film strip riding thereover along each side thereof in a direction away from the film gate, and in which side guide means are provided on each side of said compensating guide and wheel means for preventing lateral motion of the film strip as it passes over said compensating guide and wheel means.

7. A movie camera as defined in claim 6, in which a cutoff switch is provided with the cutoff switch having an actuating member yieldably urged toward the edge of the film whereby the switch operates when film is no longer passing by said actuating member, and in which the actuating member acts as part of the side guide means for maintaining the lateral positioning of the film.

8. A movie camera as defined in claim 6, in which certain of the guide means are positioned in close proximity to the sprocket whereby substantially the entire usable area of the sprocket and sprocket teeth are engaged to improve the film grip and prevent undue strain at any single one or small number of said holes at the side of the film.

9. A movie camera as defined in claim 4, in which setscrew means are provided to adjust the film gate thickness and position of the backing block, and means is provided for clamping the backing block securely to said setscrew means.

10. In a high-speed movie camera as defined in claim 1 and adapted to move a strip of film in stop and go fashion through a film gate formed in a magazine section removably attached to a main section adapted to be securely mounted on an aircraft or the like, in combination, means for providing a detachable power connection between said magazine section and said housing, registry means for holding said magazine section in exact position in said housing with the film gate in exact exposure position whereby different magazines may be exchanged in said housing while maintaining substantially the same exposure plane distance from a lens assembly in said housing, and a quick disconnect latch system formed for operative detachment through a single lever and constructed to maintain the two sections positively together and in exact position under severe conditions of vibration and sudden change of velocity.

11. The high-speed movie camera defined in claim 10, in which said guide elements comprise a pair of guide plates having surfaces spaced in said zero clearance fashion, one of said plates being substantially fixedly mounted, and the other of said plates being adjustable with respect to said first plate, and clamping means for holding said adjustable plate in tight fashion in a selected predetermined position.

12. A movie camera as defined in claim 11, in which setscrew means are provided to adjust the gate thickness and cooperate with said clamping means whereby actuation of the clamping means cinches said setscrew means tightly in a desired holding position.

13. A high-speed movie camera as defined in claim 10, in which the film magazine contains a film drive assembly comprising
   an aperture plate having a guide surface for accurately spacing the film in the film gate, and
   a backing block having a guide surface cooperating with the guide surface of the aperture plate to provide a zero clearance gate, said backing block being adjustable relative to the aperture plate to accommodate film according to the film thickness; said film drive means comprising
   a sprocket means formed to engage the film through said holes at two positions on each side of the film gate,
   guide means for directing the film through a path extending from a supply means past the sprocket to and through the film gate and back through the sprocket to a film-receiving means, and
   a sprocket drive means for driving the sprocket at a substantially constant speed,
   said guide means including an eccentrically mounted wheel means positioned for contacting the film in the path between the sprocket means and the film gate and causing the film moving toward said eccentrically mounted wheel means in a substantially uniform velocity to move from said eccentrically mounted wheel means in stop and go motion.

14. A motion-picture camera as defined in claim 13, in which the film drive means also comprises a spring-loaded compensating guide and wheel means positioned on the side of the film gate opposite the eccentrically mounted wheel means and formed for cooperation with the registration pin to hold the film stationary during the stop motion thereof.

15. A movie camera as defined in claim 14, in which the compensating guide and wheel means comprises a pair of springs adapted to yieldably urge the wheel and film strip riding thereover along each side thereof in a direction away from the film gate, and in which side guide means are provided on each side of said compensating guide and wheel means for preventing lateral motion of the film strip as it passes over said compensating guide and wheel means.